Patented Sept. 2, 1947

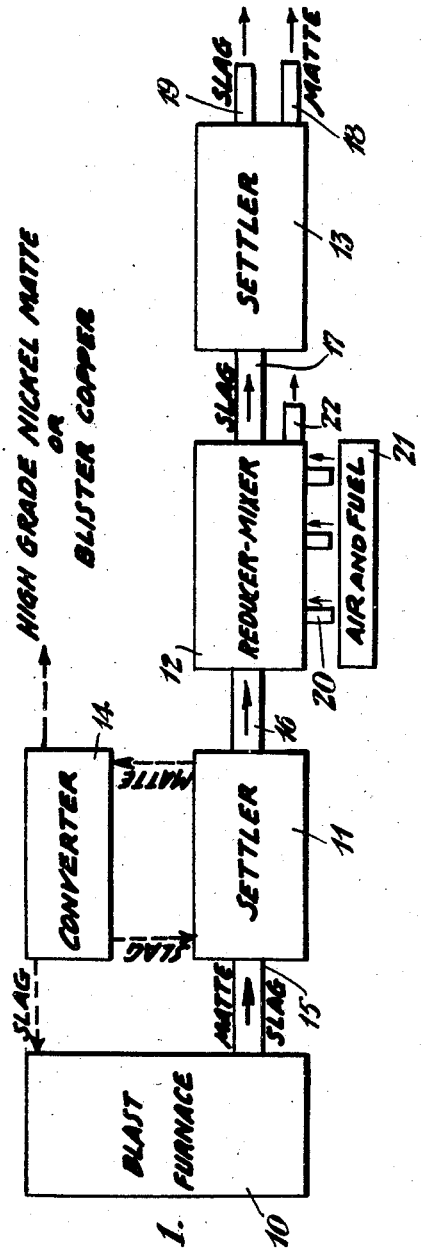
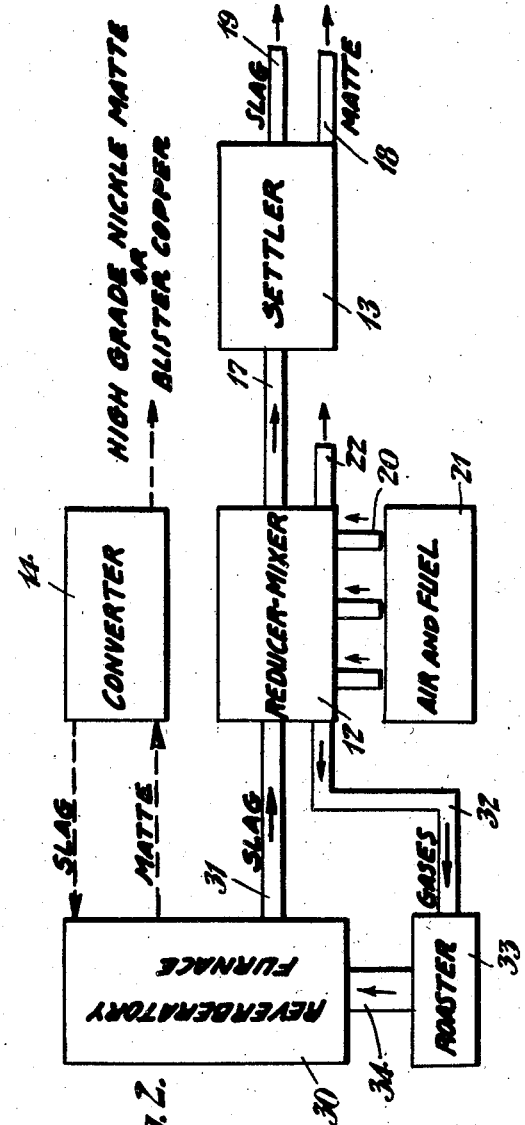

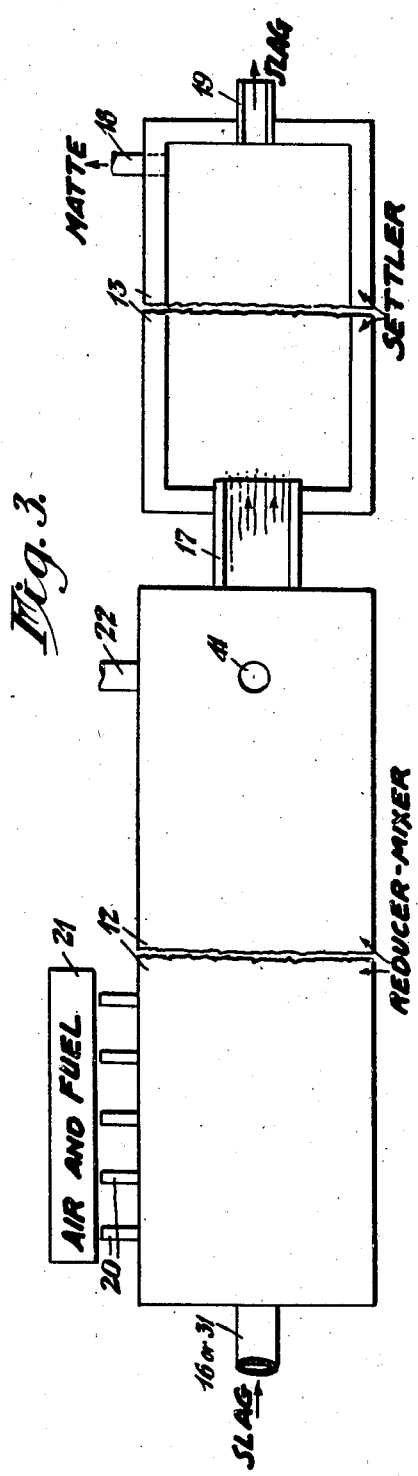
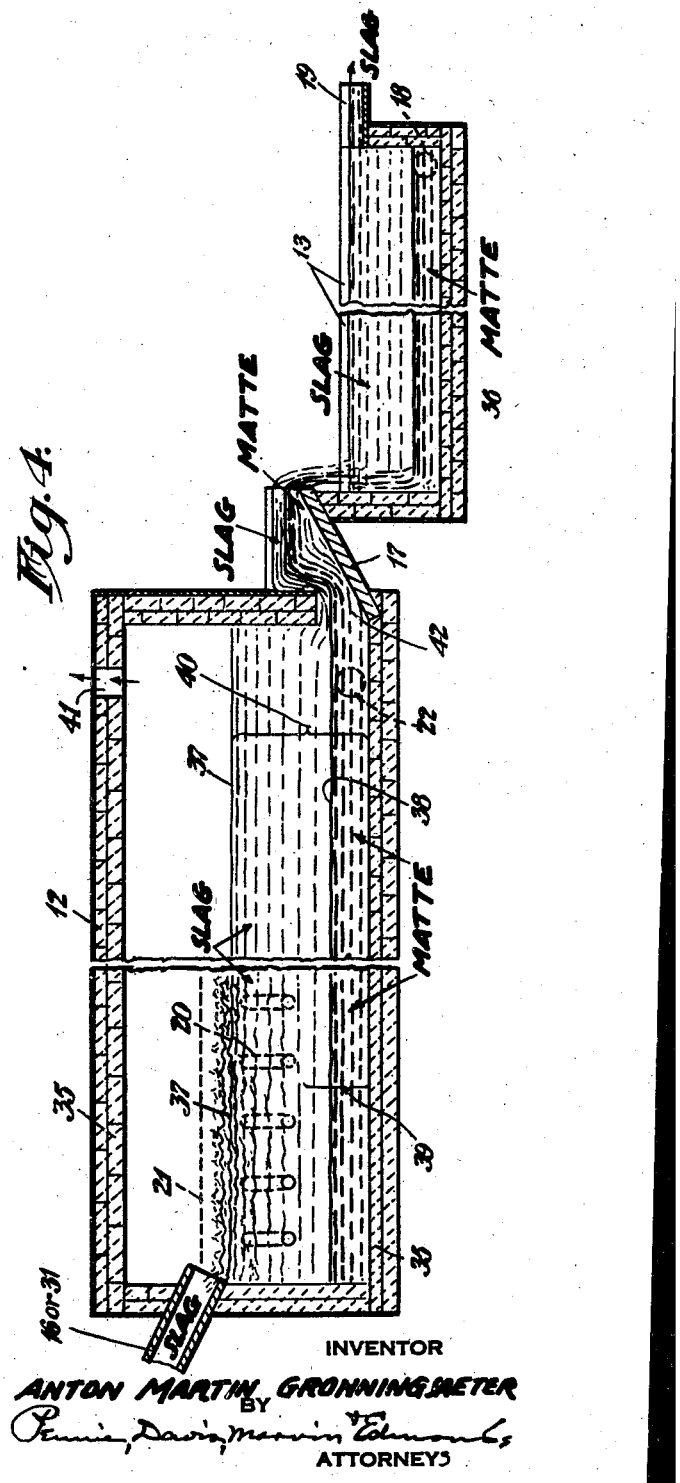

2,426,607

UNITED STATES PATENT OFFICE 2,426,607

PRODUCTION OF METALS

Anton Martin Gronningsaeter, New York, N. Y., assignor to Falconbridge Nickel Mines, Limited, Toronto, Ontario, Canada, a corporation of Canada Application April 21, 1945, Serial No. 589,675

12 Claims. (Cl. 266—37)

This invention relates to the production of metals, and has for its object certain improvements in apparatus for producing metals, such as nickel and copper. The invention relates more particularly to improvements in apparatus for the treatment of slags obtained in the smelting of metal ores, such as nickel and copper ores, to recover a substantial amount of their metal values.

The features of the invention will be better understood by referring to the accompanying drawing, taken in conjunction with the following description, in which—

Fig. 1 is a diagrammatic representation of apparatus illustrative of the invention, which is adapted for blast furnace practice;

Fig. 2 shows a modified form of the apparatus adapted for reverberatory furnace practice;

Fig. 3 is a plan view of a reducer-mixer associated with a settler, which may be used in conjunction with the apparatus of the above figures; and Fig. 4 is an elevation in section of the arrangement shown in Fig. 3.

Referring first to Fig. 1, the apparatus shown comprises a smelting furnace in the form of a blast furnace 10, a settler 11, a reducer-mixer 12, a second settler 13, and a converter 14. A matte-slag conduit 15 connects the blast furnace with the settler; a slag conduit 16 connects the first settler with the reducer-mixer; and a slag-matte conduit 17 connects the reducer-mixer with the second settler. The second settler is provided with a matte discharge 18 and a slag discharge 19. Means, not shown, are provided for transferring liquid slag from the converter to the settler, as well as solid slag to the blast furnace, if desired, and matte from the first settler to the converter.

The reducer-mixer may be patterned after the conventional converter, or slag fuming furnace, and is provided with a plurality of nozzles 20, adapted for the passage therethrough of air admixed with fuel into the reducer-mixer; conventional means 21 for mixing the air and fuel and injecting the same into the reducer-mixer; an extra discharge 22; and an opening, not shown, for the escape of gases.

Referring next to Fig. 2, the apparatus shown is essentially the same as just described, except that the smelting furnace is in the form of a reverberatory furnace 30, with means, not shown, for transferring matte from the reverberatory to the converter, and slag from the converter to the reverberatory. A slag conduit 31 connects the reverberatory with the reducer-mixer 21, while a gas conduit 32 connects the reducer-mixer with a roaster 33, which in turn communicates with the reverberatory furnace by means of a connection 34.

Referring, finally, to Figs. 3 and 4, the apparatus shown is a somewhat more detailed arrangement of a reducer-mixer 12, with a brick lining 35, and a settler 13, with a brick lining 36, which was employed in my experiments, to be discussed below. In the construction illustrated, slag charging conduit 16 is inclined downwardly into the interior of one end of the reducer-mixer, preferably terminating slightly above its normal slag level 37. A plurality of nozzles or tuyères 20 connect with the interior of the slag-charging portion of the reducer-mixer, preferably well within the normal slag zone, as shown, that is, between slag level 37 and matte level 38. This arrangement provides a relatively quiescent zone 39 below the tuyères and a relatively quiescent zone 40 beyond the tuyères toward the opposite or slag-matte discharging end of the reducer-mixer, ahead of settler 13. An opening or vent 41 is provided in the top of the reducer-mixer, preferably near the discharging end of the reducer-mixer, for the escape of gases. Slag conduit 17 connects with an outlet 42 at the bottom of the discharging end of the reducer-mixer. This conduit is advantageously in the form of an open trap-trough or trap-spout, shaped as shown. The bottom of the trough is inclined upwardly and the side walls of the trough are parallel to one another, extending a suitable distance above outlet 42. As is to be explained in more detail below, the trough is so proportioned as to permit passage therethrough of matte and slag from the reducer-mixer to the settler to maintain a substantially constant slag level within the reducer-mixer. The discharge end of the trough extends over the top of the settler, so that matte and slag passing through the trough may fall within the interior of the settler. Conduit 18 is located at the bottom of the settler for the discharge of matte and conduit 19 is located at a higher level for the discharge of final slag.

The apparatus of Fig. 1 may be operated as follows:

Nickel ore is charged into blast furnace 10, where it undergoes initial smelting. The resulting mixture of matte and slag is conducted substantially continuously through conduit 15 into first settler 11. Matte is withdrawn from the settler and transferred to converter 14, where it is blown with air in the usual manner to remove objectionable iron present therein. High-grade nickel matte is formed and withdrawn as such from the converter. The resulting converter slag may be advantageously withdrawn in part, chilled and broken up, after which it is introduced into the blast furnace charge to function essentially as basic flux material.

The remainder of the converter slag, or all of the converter slag, as the case may be, is passed in liquid form into first settler 11, where it is admixed with slag and matte coming from the blast furnace; and the combined slags are passed through conduit 16 into reducer-mixer 12. Due to the agitation caused by the introduction of air and fuel into the reducer-mixer, the slags are intimately admixed above relatively quiescent zone 39 (see Fig. 4), which causes some of the nickel and copper sulfides present in the converter slag to salt out, at the same time as the slags are exposed to selective reducing conditions in the presence of iron sulfide. Matte prills settle and form a layer of matte at the bottom of the reducer-mixer, in zones 39 and 40, as shown in Fig. 4. Slag and matte are withdrawn from the reducer-mixer through conduit 17 into second settler 13. The slag is permitted to remain substantially quiescent so that additional matte prills may settle by gravity to the bottom to merge with matte forming thereon. The settler matte is withdrawn through discharge 18, while the final slag is withdrawn through discharge 19 and discarded.

Substantially the same procedure is followed when smelting copper ores in accordance with the blast furnace practice. In such cases blister copper is of course withdrawn from the converter.

The apparatus shown in Fig. 2 may be operated as follows:

Nickel ore is fed into reverberatory furnace 30 in the usual manner, for example, from roaster 33 through connection 34. The resulting matte is transferred to converter 14, where it is blown with air to eliminate objectionable iron. High-grade nickel matte is formed and withdrawn from the converter. The resulting converter slag is transferred to the reverberatory furnace while still liquid, where it merges with the reverberatory slag proper, and where it is freed of nickel and copper to some extent. The admixed slags are conducted substantially continuously, the flow of slag being interrupted only while matte is tapped through conduit 31 (similar to conduit 16 of Figs. 1, 3 and 4), into reducer-mixer 12. Here the slag is subjected, in the presence of iron sulfide, to the reducing and mixing action of air and fuel introduced through nozzles 20. This operation is described more fully below in the case of Figs. 3 and 4. The resulting slag and matte are withdrawn through conduit 17 into settler 13. Matte is withdrawn through discharge 18 while the final slag is withdrawn through discharge 19 and discarded. Gaseous products of combustion formed in the reducer-mixer may be conducted through conduit 32 into roaster 33, where their heat is effectively utilized to roast ores about to be charged to the reverberatory furnace through connection 34, or the hot gases may be otherwise utilized.

In the production of copper, substantially the same practice is followed. The copper ore is initially smelted in the reverberatory furnace. The resulting matte is conducted to the converter where it is blown with air to form blister copper; while the converter slag is returned to the reverberatory furnace to be admixed with the reverberatory slag. The admixed slags are then conducted to the reducer-mixer where they are subjected to reduction and mixing. The slag and matte are withdrawn from the reducer-mixer and are flowed into the settler. Matte prills settle to the bottom, from which the resulting matte is withdrawn. The settler slag is passed through its discharge and is discarded.

These features of the invention may be better understood by referring to the manner in which the more detailed apparatus of Figs. 3 and 4 may be operated. The slags are passed through conduit 16 or 31 into reducer-mixer 12 until slag level 37 is reached. Fuel and air are passed through nozzles or tuyères 20 into the body of slags, rather than the body of matte which tends to collect at the bottom of the reducer-mixer. This arrangement permits the use of a smaller settler, although this is not normally necessary. As noted above, the nozzles or tuyères are located toward the charging portion of the reducer-mixer. As a result of this arrangement, agitation or mixing of the slag is primarily confined to the charging portion of the reducer-mixer above the nozzles or tuyères, so that slag below the nozzles or tuyères and in the discharging portion of the reducer-mixer may be in a relatively quiescent condition, thus facilitating settling out of matte prills and merging thereof with settling at the bottom of the reducer-mixer. The amounts and rate of fuel and air passed into, and the rate of passing the slags through, the reducer-mixer are regulated to insure the desired reducing and mixing conditions. The amount of reducing agent and the temperature of the slag may thus be adjusted to a point at which the desired selective reducing action or actions take place.

As further amounts of slag are passed through conduit 16 into the charging end of the reducer-mixer, matte and slag are passed from the reducer-mixer through outlet 42 at the discharging end of the reducer-mixer. Conduit 17, as pointed out above, is designed as a trap-trough or trap-spout to permit passage of matte and slag therethrough to settler 13 at a rate to maintain the slag in the reducer-mixer approximately at its normal level 37. As the amount of slag in the reducer-mixer rises in level, a point is reached at which its weight is sufficient to force matte as well as slag through outlet 42, and hence through conduit or trough 17. In this manner, slag may be continuously passed into the reducer-mixer and treated slag and matte may be continuously passed out of the reducer-mixer.

Hot gases formed in the reducer-mixer as a result of the combustion of the fuel and air are passed through opening 41 in the top of the reducer-mixer near the discharging end. The hot gases may be exhausted to the open atmosphere or passed through a conduit connecting the opening to some other place for use. As shown in Fig. 2, for example, the hot gases may be passed through conduit 32 to roaster 33.

Matte and slag passing through conduit or trough 17 are dropped into settler 13, where the mixture is permitted to remain substantially quiescent. Matte prills settle out and merge with matte forming at the bottom of the settler. Since slags are continuously passed through the reducer-mixer, slag and matte may be continuously passed through the settler.

In a presently-preferred practice, finely pulverized coal is blown into the slag bath in the reducer-mixer with air, the relative amounts of air and coal being so regulated as to establish reducing conditions in and over the slag bath. The amount of air and coal is also preferably regulated in conjunction with the rate of speed with which the slags are treated to provide and maintain a predetermined desirable temperature in the slag bath; and, if desired, to raise the temperature of the slag bath to a point which assists the reduction and at which the settling out of matte prills may be facilitated when the slag is passed into the settler. The desired temperature may of course be obtained in any other suitable manner.

This operation will effect a very good mixing of the slags within the reducer-mixer and this, in turn, facilitates the salting out of the nickel and copper sulfides to a point that corresponds to the solubility of sulfides in the final mixed slag. The reducing conditions established in the presence of iron sulfide to a large extent reduce oxides and silicates of nickel and copper and convert them to sulfides. Ordinarily, there will be enough iron sulfide present in the slag to effect this highly desirable result. If not, it is advantageous to introduce special liquid matte containing the requisite iron sulfide or solid iron sulfide containing ore into the reducer-mixer.

In the production of such metals as nickel and copper, at least two different slags are produced, one in a blast furnace or in a reverberatory furnace, whichever is employed, and one in a converter. In the practice of the present invention, one slag is used to clean the other slag. The slags have differing specific gravities and differing solubility characteristics for metal sulfides normally present in the slags. The converter slag is relatively high in iron, low in silica, of higher specific gravity, and has a higher solubility characteristic for metal sulfides, while the blast furnace slag or reverberatory furnace slag, on the other hand, is lower in iron, higher in silica, of lower specific gravity, and has a lower solubility characteristic for metal sulfides. The slags are passed while still liquid into the mixing and reducing zone of the reducer-mixer, and subjected to mixing and reduction in the presence of iron sulfide at an appropriate elevated temperature. Due to the intimate admixing of the two slags, the solubility characteristics of the slags for metal sulfides are changed. The solubility characteristic of the converter slag is lowered, so that a substantial amount of its metal sulfides is salted out.

The mixing step also functions to average the specific gravities of the slags. That of the converter slag is normally so high as to retard the settling of matte prills. As a result of the intimate mixing of the two slags, the disadvantage of the higher specific gravity of the converter slag is substantially lessened, and settling conditions for matte prills are materially improved. The slag resulting from the reduction and mixing operation is permitted to settle, after which the resulting matte and final slag are separated.

The amount of heat required to conduct the mixing and reducing operation in the reducer-mixer is relatively small, and need not be excessively high. The heat value contained in the reducing gases escaping from the reducer-mixer may be utilized for some useful heating purposes, and the cost of the coal used in the reducer-mixer may therefore be divided between two or more operations. This is very important, since the gaseous products of reduction escaping from the reducer-mixer may contain from two-thirds to three-fourths or even more of the heat value of the fuel in a form that may be conveniently utilized for drying, preheating and roasting of the ore about to be charged into the smelting furnace, for firing of a reverberatory furnace, or for other heating purposes, such as making steam, etc. Even the use of a large amount of fuel in the reducer-mixer may be justified because part of the cost may be charged to other useful and necessary operations. If the slag to be treated contains an appreciable amount of cobalt, a prolonged treatment of the slag under reducing conditions will remove a considerable amount of the cobalt from the slag and thereby effect a considerable concentration of the same in the matte.

In order to obtain the desired results economically, it is highly important to provide and maintain practically uniform operating conditions. To this end, in the presently preferred practice of the present invention, the slag is fed practically continuously into the reducer-mixer. In the blast furnace practice, the blast furnace slag is fed continuously into the settler, where it is admixed with the converter slag, and the combined slags are then passed into the reducer-mixer. In the reverberatory furnace practice, the combined reverberatory and converter slags coming from the furnace are fed continuously into the reducer-mixer.

The substantially continuous feeding of slag to the reducer-mixer has important advantages. When the optimum conditions have been established that are practical under the circumstances, in regard to mixing and salting out of the sulfides, the reduction of oxides and silicates in the presence of iron sulfide, and the slag temperature and slag viscosity favorable to the operations, it is comparatively easy to maintain and fairly closely control such optimum conditions. At the same time, this accurate control under such conditions is possible with a minimum of labor and attendance, a minimum of fuel and a minimum of wear and tear on the equipment. The whole treatment becomes comparatively cheap compared to what a batch process would cost, and it should not, therefore, take much saving to justify the treatment. The continuous operation is therefore preferred. But there may be cases where it is economically advantageous to use the more costly batch operation, for example, in the recovery of cobalt.

Nickel sulfide ores subjected to present conventional smelting operations generally contain cobalt in the ratio of about 3–6 parts to about 100 parts nickel. As a result of the treatment of the smelter matte in the converter, a great deal of the cobalt, for example 60 to 90%, is passed into the slag. The cobalt may then be present in the final slag, which has heretofore been discarded, in the ratio, for instance, of about 50 parts to about 100 parts of nickel. In other words, the slag may contain one-half or more as much cobalt as nickel. An important advantage of the present invention may lie in the treatment of such slag in the reducer-mixer to recover the cobalt. By prolonging the treatment, conducted as far as economic conditions justify, a considerable part of the cobalt is reduced and collected in a small amount of copper-nickel-cobalt matte.

In the smelting of nickel-copper ores containing a valuable amount of cobalt, the slags may be treated in accordance with the invention selectively to recover the copper-nickel, or the copper-nickel-cobalt. In addition, if it is desired to recover a substantial amount of the cobalt separately, it is advantageous to proceed as described above in order selectively to recover the copper-nickel, leaving the cobalt in the slag. This cobalt-containing slag is then separately treated in a reducer-mixer in order to throw the cobalt out of the slag. To this end, sufficient fuel and air are injected into the slag to raise it to the temperature at which the oxide and silicate of cobalt are reduced. To insure conversion of the reduced cobalt to cobalt sulfide, a suitable amount of iron sulfide is caused to be present in the slag. This is advantageously accomplished by feeding iron sulfide into the reducer-mixer.

While the cobalt-containing slag, substantially lowered in copper and nickel, may be treated in a reducer-mixer, such as that described above, I prefer to use one of the converter type which may be tilted from position to position during successive stages of the operation. Thus, the reducer-mixer may be tilted at an angle to permit a batch of the slag to be admitted therein while the tuyères are above the normal slag level. As the fuel and air are injected, the reducer-mixer is tilted to locate the tuyères at or near the bottom thereof, so that matte tending to collect at the bottom is intimately admixed with the slag. The reducing-mixing action is conducted until the oxide and silicate of cobalt are reduced and converted to cobalt sulfide by the iron sulfide present in the slag; the reducer-mixer is then tilted to bring the tuyères above the slag level; after which the mixture is permitted to settle while still in the reducer-mixer. The reducer-mixer is next tilted more and more as the top layer of slag is withdrawn and then the lower layer of matte containing the desired cobalt.

The practice of the invention may be considered in conjunction with the specific treatment of slags obtained in the smelting of nickel-copper ores in a blast furnace, the method of obtaining the slags being that described above and illustrated in Fig. 1. The slags were passed while molten from a first settler 11 to and through a reducer-mixer 12 and then to and through a second settler 13, such as illustrated in Figs. 3 and 4. Although the experiments were conducted on a pilot plant scale, the operating conditions were somewhat irregular, as is usual in such cases. On a commercial scale, the operating conditions would, of course, be more regular. In the following table, data is set forth in percentages on typical examples of results obtained in the treatment of such slags. It will be noted that in each of the seven (7) examples, data is set forth to indicate the composition of the slag as it went into the reducer-mixer, as well as the composition of the slag as it went out of the second settler. It will be noted that there are some gaps in the data set out below. This is due to a shortage of chemical help. The missing data, however, is not considered essential because more than enough data is reported to show very definite trends in recovery of the metals sought.

|  | Cu | Ni | Co | SiO$_2$ | Fe | Fe$_3$O$_4$ | S |
|---|---|---|---|---|---|---|---|
| Slag into reducer-mixer | 0.195 | 0.236 | ------ | 31.60 | 34.05 | 5.25 | 1.41 |
| Slag out of settler | 0.13 | 0.106 | ------ | 31.20 | 34.50 | 4.91 | 1.16 |
| Slag into reducer-mixer | 0.262 | 0.411 | 0.153 | 30.50 | 34.20 | 5.43 | 1.71 |
| Slag out of settler | 0.116 | 0.101 | 0.120 | 31.70 | 34.45 | 3.58 | 1.05 |
| Slag into reducer-mixer | ------ | 0.117 | ------ | 32.10 | 37.50 | ------ | ------ |
| Slag out of settler | 0.112 | 0.068 | 0.084 | 31.66 | 38.10 | ------ | ------ |
| Slag into reducer-mixer | ------ | 0.15 | ------ | 30.60 | 36.33 | 3.41 | 1.56 |
| Slag out of settler | 0.105 | 0.071 | ------ | 31.24 | 37.05 | 3.10 | 1.43 |
| Slag into reducer-mixer | 0.173 | 0.218 | ------ | 28.8 | 38.50 | 5.26 | 1.73 |
| Slag out of settler | 0.132 | 0.088 | ------ | 29.44 | 38.00 | 4.22 | 1.47 |
| Slag into reducer-mixer | 0.185 | 0.268 | 0.123 | 29.14 | 37.92 | 4.53 | 1.78 |
| Slag out of settler | 0.111 | 0.073 | 0.099 | 29.04 | 37.92 | 4.00 | 1.44 |

Referring to the S, sulfur, column, it will be noted that there is an appreciable drop in each of the examples. This clearly demonstrates the salting out of metal sulfides. Referring next to the Fe$_3$O$_4$, magnetite, column, it will be noted that there is a very small drop, thus demonstrating that reduction of the magnetite is unnecessary for the reduction of the nickel and copper oxides and silicates. The column for Ni, nickel, illustrates that a substantial amount of the nickel is removed from the slag as it goes through the reducer-mixer and that the nickel is lowered to approximately the same level irrespective of the amount of nickel in the ingoing slag. The Cu, copper, column shows the same trend as the Ni column. Finally, the Co, cobalt, column, shows that the nickel and copper are lowered without any substantial lowering of the cobalt content of the slag.

It will be clear to those skilled in this art that the above examples are merely by way of illustration and that the invention readily lends itself to other useful modifications in practice.

I claim:

1. In apparatus for treating slags to recover metals therefrom, the improvement comprising a reducer-mixer having a chamber in which to subject the slags to reduction and mixing, an inlet at the charging end of the chamber for the introduction of the slags, means for injecting fuel and air into the chamber below its normal slag level, an opening in the upper part of the chamber for the escape of gases, an outlet at the bottom of the discharging end of the chamber for the withdrawal of treated slag, and a trap-spout connecting the outlet to permit the maintenance of a predetermined slag level in the chamber as slags are passed into, through and out of the reducer-mixer.

2. Apparatus according to claim 1, in which the means for injecting fuel and air are located at a level in the chamber intermediate the top and bottom levels of the body of slags normally in the chamber so as to provide a relatively quiescent zone in the body of slags below the level of the injecting means.

3. Apparatus according to claim 1, in which the means for injecting fuel and air are located only at the charging portion of the chamber so as to provide a relatively quiescent zone for the slags at the discharging portion of the chamber.

4. Apparatus according to claim 1, in which the means for injecting fuel and air are located at a level in the chamber intermediate the top and bottom levels of the body of slags normally in the chamber so as to provide a relatively quiescent zone in the body of slags below the level of the injecting means; and the injecting means are located only at the charging portion of the chamber so as to provide a relatively quiescent zone for the slags at the discharging portion of the chamber.

5. Apparatus according to claim 1, in which the trap-spout communicates with a settler, said settler being provided with an outlet at its bottom for the withdrawal of matte and with a separate outlet at the normal slag level of the settler for the withdrawal of treated slag.

6. Apparatus according to claim 1, in which the means for injecting fuel and air are located at a level in the chamber intermediate the top and bottom levels of the body of slags normally in the chamber so as to provide a relatively quiescent zone in the body of slags below the level of the injecting means; the trap-spout communicates with a settler; and the settler is provided with an outlet at its bottom for the withdrawal of matte and with a separate outlet at the normal slag level of the settler for the withdrawal of treated slag.

7. Apparatus according to claim 1, in which the means for injecting fuel and air are located only at the charging portion of the chamber so as to provide a relatively quiescent zone for the slags at the discharging portion of the chamber; the trap-spout communicates with a settler; and the settler is provided with an outlet at its bottom for the withdrawal of matte and with a separate outlet at the normal slag level of the settler for the withdrawal of treated slag.

8. Apparatus according to claim 1, in which the means for injecting fuel and air are located at a level in the chamber intermediate the top and bottom levels of the body of slags normally in the chamber so as to provide a relatively quiescent zone in the body of slags below the level of the injecting means; the injecting means are also located only at the charging portion of the chamber so as to provide a relatively quiescent zone for the slags at the discharging portion of the chamber; the trap-spout communicates with a settler; and the settler is provided with an outlet at its bottom for the withdrawal of the slag and with a separate outlet at the normal slag level of the settler for the withdrawal of treated slag.

9. In apparatus for treating slags to recover metals therefrom, the improvement comprising a reducer-mixer having a chamber in which to subject the slags to reduction and mixing, an inlet at the charging end of the chamber for the introduction of slags, said inlet being located substantially no lower than the normal level of the body of slags in the chamber to inhibit disturbance of prills settling to and matte forming at the bottom of the chamber, means for injecting fuel and air into the chamber, said means being located at a level in the chamber intermediate the top and bottom levels of the body of slags so as to provide a relatively quiescent zone for the slags below the level of the fuel and air-injecting means, an opening in the upper part of the chamber for the escape of gases, an outlet at the bottom of the discharging end of the chamber for the withdrawal of matte and slag, and a trap-spout connecting the outlet to permit the maintenance of a predetermined slag level in the chamber as slags are passed into, through and out of the reducer-mixer, said outlet being sufficiently large to extend below and above the normal level of the matte forming at the bottom of the chamber so that when the slags reach their normal level in the chamber both matte and slag are discharged through the outlet and trap-spout.

10. Apparatus according to claim 9, in which the means for injecting fuel and air are located only at the charging portion of the chamber so as to provide a relatively quiescent zone for the slag at the discharging portion of the chamber.

11. Apparatus according to claim 9, in which the trap-spout communicates with a settler, said settler being provided with an outlet at its bottom for the withdrawal of matte and with a separate outlet at the normal slag level of the settler for the withdrawal of treated slag.

12. Apparatus according to claim 9, in which the means for injecting fuel and air are located only at the charging portion of the chamber so as to provide a relatively quiescent zone for the slag at the discharging portion of the chamber; the trap-spout communicates with a settler; and the settler is provided with an outlet at its bottom for the withdrawal of matte and with a separate outlet at the normal slag level of the settler for the withdrawal of treated slag.

ANTON MARTIN GRONNINGSAETER.

REFERENCES CITED

The following references are of record in the file of this patent:

UNITED STATES PATENTS

| Number | Name | Date |
| --- | --- | --- |
| 683,378 | Brown | Sept. 24, 1901 |
| 2,054,921 | Betterton et al. | Sept. 22, 1936 |
| 2,054,922 | Betterton et al. | Sept. 22, 1936 |
| 390,785 | Koneman | Oct. 9, 1888 |
| 542,148 | Davies | July 2, 1895 |
| 558,648 | Iles | Apr. 21, 1896 |

FOREIGN PATENTS

| Number | Country | Date |
| --- | --- | --- |
| 579,804 | France | Oct. 24, 1924 |